United States Patent [19]

Coombe

[11] 4,165,773
[45] Aug. 28, 1979

[54] METHOD FOR PRODUCING ELECTRONICALLY EXCITED NITROGEN FLUORIDE

[75] Inventor: Robert D. Coombe, Thousand Oaks, Calif.

[73] Assignee: Rockwell International Corporation, El Segundo, Calif.

[21] Appl. No.: 907,213

[22] Filed: May 18, 1978

[51] Int. Cl.² ............................ C06B 23/00; H01S 3/22
[52] U.S. Cl. ....................................... 149/109.6; 149/35; 149/109.4; 331/94.5 G
[58] Field of Search ..................... 149/109.4, 109.6, 35, 149/119; 331/94.5 G

[56] References Cited

U.S. PATENT DOCUMENTS

| | | | |
|---|---|---|---|
| 3,906,395 | 9/1975 | Kompa et al. | 331/94.5 G |
| 3,959,741 | 5/1976 | Meinzer | 331/94.5 G |
| 4,003,771 | 1/1977 | Lubowitz | 149/119 |
| 4,115,168 | 9/1978 | Buonadonna et al. | 149/109.4 |
| 4,120,708 | 10/1978 | Flanagan | 149/119 |

Primary Examiner—Edward A. Miller
Attorney, Agent, or Firm—L. Lee Humphries; Craig O. Malin

[57] ABSTRACT

Electronically excited nitrogen fluoride is formed by reacting fluorine atoms with azide radicals according to the reaction:

$$F + N_3 \rightarrow NF^* + N_2.$$

In a preferred embodiment, the azide radical is provided by using $HN_3$, and the atomic F is formed by discharging microwaves through either $F_2$ or $CF_4$, or by thermally decomposing $F_2$.

5 Claims, 5 Drawing Figures

METHOD FOR PRODUCING ELECTRONICALLY EXCITED NITROGEN FLUORIDE

BACKGROUND OF THE INVENTION

1. Field of the Invention

This invention relates the field of chemistry and particularly to the field of producing molecules in excited states, such as singlet molecular NF, abbreviated to NF*.

2. Description of the Prior Art

A molecule is in an excited electronic state when the arrangement of its electrons about the nucleus places it in an energy state about its usual ground state. Molecules such as NF are known to exist in several different energy states. The two lowest excited electronic states for NF are the NF*($a^1\Delta$) and the NF*($b^1\Sigma^+$) states.

Prior art methods of producing the NF* states are by microwave discharge of the $NF_3$ molecule or by chemical means. The only known chemical means of producing NF* is by reacting $NF_2$ with H, D, or $CH_3$ to produce NF*($a^1\Delta$), i.e. $H + NF_2 \rightarrow NF^*(a^1\Delta)$. NF*($b^1\Sigma^+$) can then be produced from NF*($a^1\Delta$) via energy transfer from $O_2^*(^1\Delta g)$, $I^*(5\ ^2P_{\frac{1}{2}})$, or HF($v \geq 2$) as described by Herbelin and Cohen in CHEMICAL PHYSICAL LETTERS, Vol. 20, page 605 (1973).

Both the prior art methods of producing NF* have problems which severely limit their usefulness. The microwave discharge method produces the NF* in low concentrations. Although higher concentrations of NF* are produced by the known chemical reaction of $NF_2$, the hydrogen used in the reaction quenches the NF*. Further, it is difficult to obtain the atomic hydrogen and utilize it before it recombines to form molecular hydrogen.

The NF*($a^1\Delta$) and NF*($b^1\Sigma^+$) states are metastable, with radiative lifetimes of approximately 1 second and 15 mseconds, respectively. Emission from these states occurs within rather narrow bandwidths, the a→x transition occurring at 874.2 nm and the b→x transition at 528.8 nm. NF*($a^1\Delta$) is known to react with vibrationally excited HF, abbreviated to HF$^\dagger$, or any of several other known transfer agents to pump NF* ($a^1\Delta$) to the NF* ($b^1\Sigma^+$) state. This reaction has very attractive features for a chemical laser because it involves reagent which, in view of the present invention, are readily available and can be produced in relatively high concentrations. Additionally, the reaction produces simple species which should not be deleterious to the operation of a laser. Thus, the molecule NF*($a^1\Delta$) has practical utility as a pumping reagent in a chemical laser.

SUMMARY OF THE INVENTION

It is an object of the invention to provide an improved method of forming electronically excited NF in the $a^1\Delta$ state.

It is an object of the invention to provide an improved method of forming electronically excited NF in both the $a^1\Delta$ and $b^1\Sigma+$ states.

It is an object of the invention to provide electronically excited NF without utilizing atomic hydrogen.

It is an object of the invention to provide electronically excited NF which can be used for a chemical laser.

According to the invention, electronically excited nitrogen fluoride is formed by reacting fluorine atoms with azide radicals according to the reaction:

$$F + N_3 \rightarrow NF^* + N_2.$$

In a preferred embodiment, the azide radical is provided by using $HN_3$, and the atomic F is formed by discharging microwaves through either $F_2$ or $CF_4$, or by thermally decomposing $F_2$.

These and other objects and features of the present invention will be apparent from the following detailed description, taken with reference to the accompanying drawings.

DESCRIPTION OF THE PREFERRED EMBODIMENT

Figure 1:
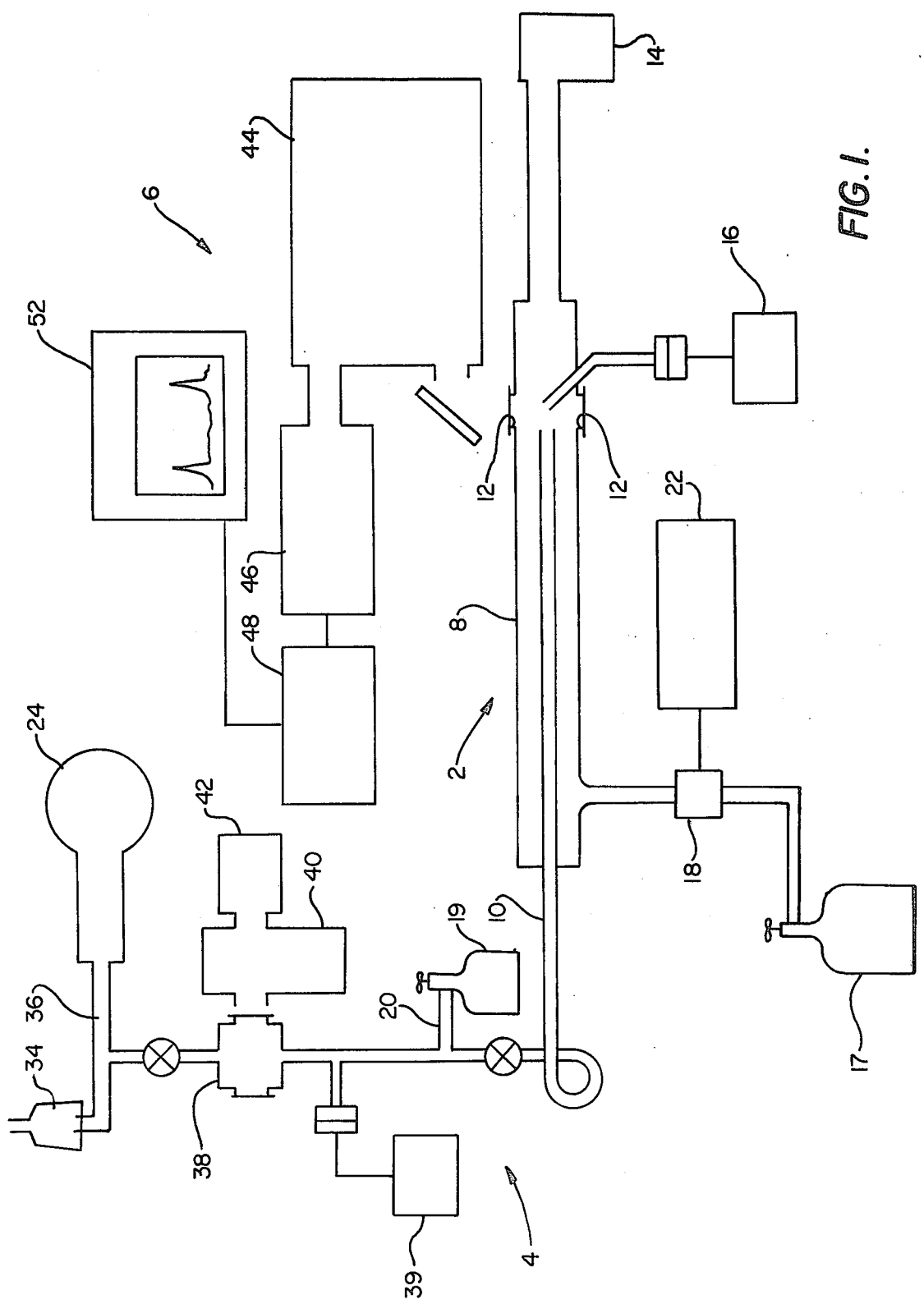
FIG. 1 is a schematic flow chart showing the laboratory set up used to generate the NF* and to evaluate the method.

The apparatus used to generate the NF* and evaluate the reaction consists of a variable slide flow tube 2, a gas handling system 4, and an emission detection apparatus 6 as shown in FIG. 1. The flow tube 2 consists of a teflon cylinder 8 that is 90 cm in length with an internal diameter of 3.2 cm. The slide 10 is a 13 mm stainless steel tube with its exterior surface coated with teflon. Emissions from within flow tube 2 are viewed through 2.5 cm diameter observation ports 12 covered with quartz windows which are sealed to the tube with "o" rings. Gases are pumped through flow tube 2 by a 500 cfm pump 14. The linear velocity of the flowing gases varies with the total pressure in the tube. Most experiments are performed at pressures of ~700 mtorr, for which the linear velocity is ~1200 cm/sec. Total pressures in the observation zone are monitored using a capacitance manometer 16.

Absolute flowrates of Ar, $F_2$, $CF_4$, $Cl_2$, and $CO_2$ are monitored using mass flowmeters. Fluorine atoms are generated by passing either $CF_4$ of $F_2$ 17 heavily diluted in Argon through a 2450 MHz microwave discharge in fluorine generator 18. The stream of discharged gases enters flow tube 2 at approximately 65 cm upstream of viewing port 12. The concentration of fluorine atoms present in the stream is determined by titration with $Cl_2$ 19 which enters the system through tube 20 during the titration period. Different concentrations of fluorine atoms are obtained by varying the power of microwave generator 22 from 20 W to 70 W. Of course, fluorine atoms for use in the reaction of the invention can be generated by other known methods such as the thermal decomposition of $F_2$ in a precombuster.

Figure 2:
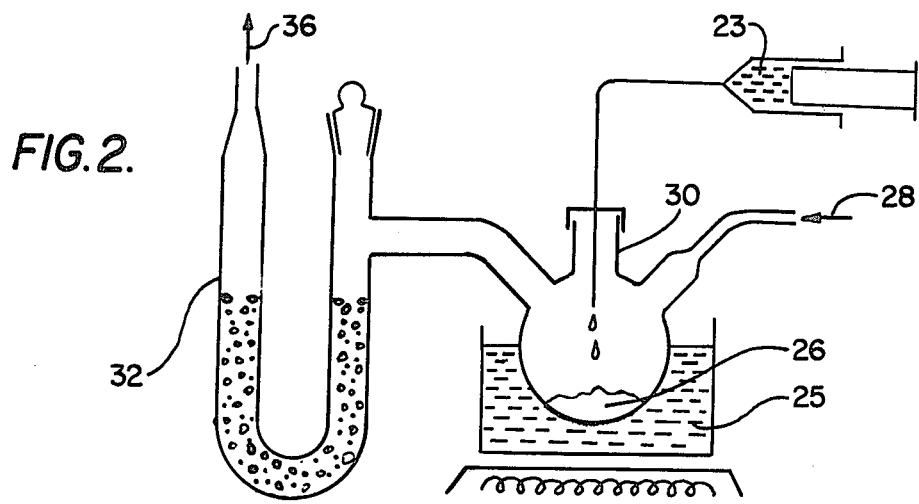
FIG. 2 is a schematic flow chart showing the laboratory set up used to generate $HN_3$ for use as a reagent in the reaction of the invention.

Gaseous $HN_3$ is generated by dropping a 75% aqueous solution of $H_2SO_4$ 23 onto solid $NaN_3$ 26 at a metered rate in generator 24 as shown in FIG. 2. The solid is held at 323° K. utilizing oil bath 25 to prevent possible condensation of the $HN_3$. A flow of argon 28 is passed through the reaction vessel 30 to carry the $HN_3$ through a U-tube drying column 32 and into a hood 34. $HN_3$ is admitted to the flow reactor by bleeding a small portion of the HN₃/Ar stream 36 into the vacuum system. The HN₃/Ar is passed through a 5.8 cm absorption cell 38 prior to entering the actual flow tube 2. The pressure drop between cell 38 and flow tube 2 is adjusted such that a pressure of 10 torr in the cell corresponded to 10 mtorr in the flow tube. Pressures in the absorption cell are measured using an inductance manometer 39. The proportion of HN₃ in the HN₃/Ar stream is determined by monitoring its absorption in the cell at 206.2 nm using monochromator 40 and photo multiplier tube 42. The light source used is an electrodeless $I_2$ lamp which emits the $6^2P_{3/2} \rightarrow 5^2P_{\frac{1}{2}}$ iodine atom line at this wavelength. For the conditions of the experiments, $HN_3$ comprises typically 10–15% of the total HN₃/Ar flow.

Emissions from observation zone 12 of flow tube 2 are passed through a 0.5 m scanning monochromator 44 and detected by photomultiplier tube 46. The response of PMT 46 is monitored by photon counting apparatus 48 consisting of an amplifier-discriminator and a counting unit, and recorded on an X-Y recorder 52.

EXAMPLE I

Small amounts of HN₃ (<5 mtorr) were added to a stream of gases containing 10–100 mtorr of fluorine atoms at a total pressure of 700 mtorr. This created a brilliant green chemiluminescence which was readily identified at the $b^1\Sigma^+ \rightarrow X^3\Sigma^-$ transition of NF. A complete spectrum of the emission was measured from 500 nm to 900 nm. The most prominent features of the measured spectrum were the $b^1\Sigma^+ \rightarrow X^3\Sigma^-$ and $a^1\alpha \rightarrow X^3\Sigma^-$ transitions of NF. Only the single 874.2 nm band of the $a^1\Delta$ emission was observed. Several bands of the b→X transition were present in the spectrum, however, with the O,O transition at 528.8 nm being by far the most intense. Other features visible in the spectrum included overtone bands of vibrationally excited HF and first positive ($B^3\pi_g \rightarrow A^3\Sigma_u^+$) bands of electronically excited N₂. The HF overtones were identified as the 5-1, 4-0, and 3-0 transitions. The R(1) line of the 3-0 band is separated from the peak of the NF $a^1\Delta \rightarrow X^3\Sigma^-$ transition by only 0.2 nm and these features were resolved in the spectra only when slitwidths of 100 μm were used. The N₂ first positive bands were visible only when higher partial pressures of HN₃ and fluorine atoms were used. The intensity distribution of these bands was strongly red-shifted relative to the normal distribution obtained from nitrogen atom recombination, the most intense bands occurring in the Δv=2 and Δv=3 sequences. The maximum intensity of the N₂ features was less than 1% of that of the NF b→x emission. Since the radiative lifetime of N₂* ($B^3\pi_g$) is more than three orders of magnitude shorter than that of NF* ($b^1\Sigma^+$)[10], the N₂* was present only in trace quantities relative to NF*.

The above results were obtained with slide tube 10 positioned at the edge of viewing port 12 such that emissions produced within the first 2 msec after contact of the reagents were observed. The mixing time for these conditions should be about 0.2 msec. A cursory scan of the time dependence of the emissions was made by moving the slide tube back from the observation zone. The risetimes of the NF* ($b^1\Sigma^+$) and HF⁺ emissions were not resolvable within the 2 msec observation time, and both species had similar decay times. For low fluorine atom pressures, the NF* ($a^1\Delta$) emission exhibited a peak at about 5 msec followed by a slow decay as discussed above.

Addition of CO₂ (a known quencher of vibrationally excited HF) to the system at partial pressures of 200 mtorr resulted in substantial quenching of both the HF and NF* ($b^1\Sigma^+$) emissions. The presence of CO₂ at this pressure was observed to enhance the intensity of the NF* ($a^1\Delta$) emission. Addition of CO₂ in considerably larger quantities (>400 mtorr) resulted in some quenching of the $a^1\Delta$ emission.

These observations are consistant with the following reactions:

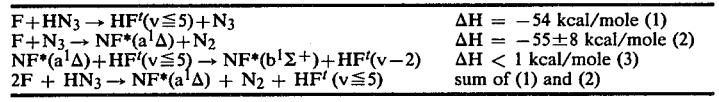

| | |
|---|---|
| $F + HN_3 \rightarrow HF^\dagger(v \leq 5) + N_3$ | $\Delta H = -54$ kcal/mole (1) |
| $F + N_3 \rightarrow NF^*(a^1\Delta) + N_2$ | $\Delta H = -55 \pm 8$ kcal/mole (2) |
| $NF^*(a^1\Delta) + HF^\dagger(v \leq 5) \rightarrow NF^*(b^1\Sigma^+) + HF^\dagger(v-2)$ | $\Delta H < 1$ kcal/mole (3) |
| $2F + HN_3 \rightarrow NF^*(a^1\Delta) + N_2 + HF^\dagger(v \leq 5)$ | sum of (1) and (2) |

Fluorine atoms first react with HN₃ in what should be a very fast reaction to produce vibrationally excited HF⁺ and N₃ radicals. The observation of HF⁺ v=5→v=1 overtone emission is consistent with the exothermicity of reaction (1). NF* ($a^1\Delta$) is produced by a subsequent reaction of fluorine atoms with N₃. Although NF* ($b^1\Sigma^+$) might be made directly in reaction (2), the fact that the $b^1\Sigma^+$ and HF⁺ emissions exhibited similar temporal behavior and that addition of CO₂ to the system quenched both species strongly suggests that process (3) is the dominant route for production of NF* ($b^1\Sigma^+$).

EXAMPLE II

Figure 3:
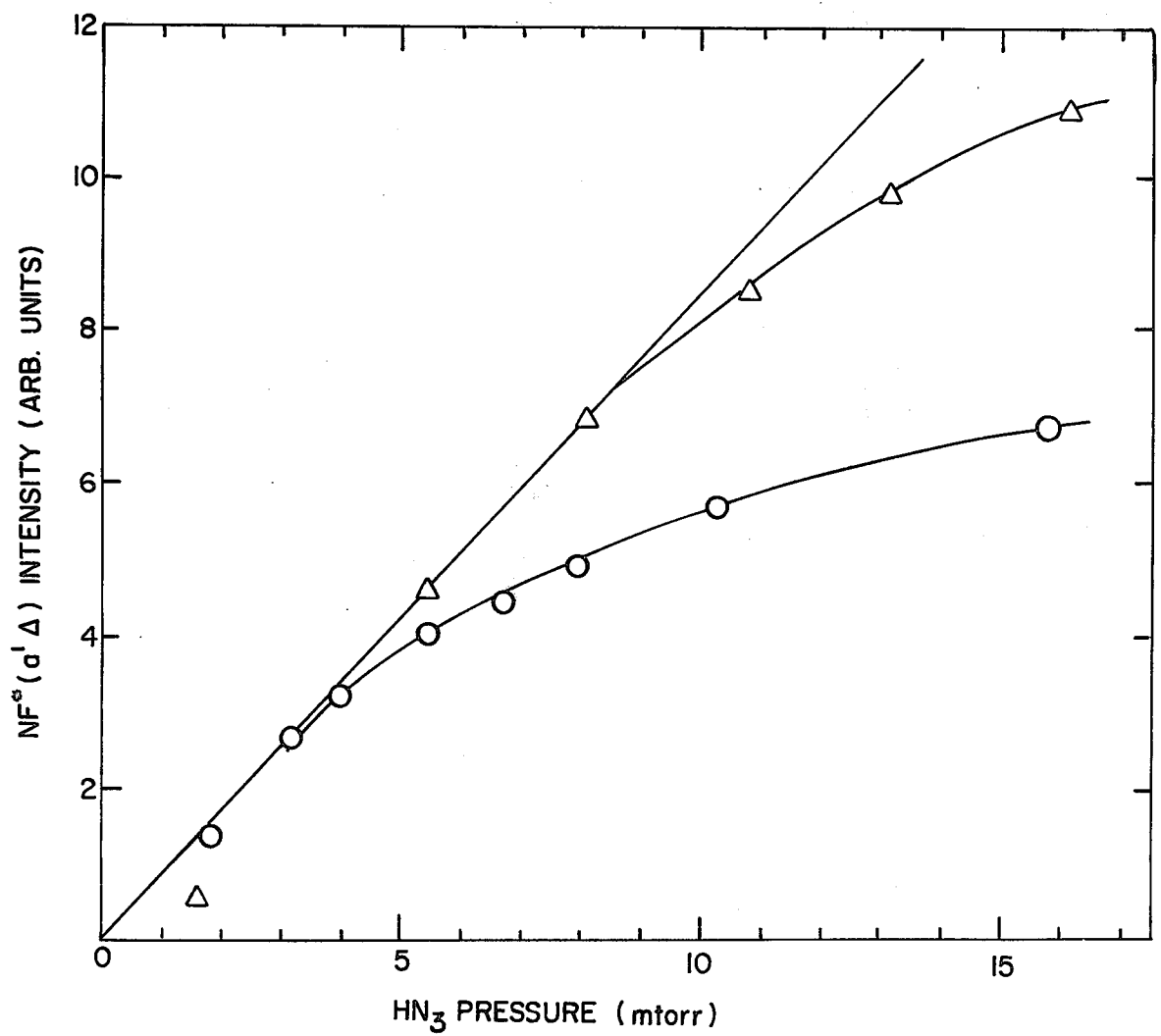
FIG. 3 is a plot of the NF*($a^1\Delta$) intensity vs. the partial pressure of $HN_3$ added to the system, with $CO_2$ added to the flow.

For Example II, the amount of HN₃ added to the system was varied in order to measure the NF*($a^1\Delta$) and NF*($b^1\Sigma^+$) intensities as a function of the amount of HN₃ added to the system. For these experiments, larger concentrations of F atoms (>75 mtorr) were used in order to insure that pseudo first order kinetics still applied for the larger concentrations of HN₃ used. Risetimes were not observable for HF⁺, NF*($b^1\Sigma^+$), or NF*($a^1\Delta$) under these conditions. HN₃ proportions were carefully checked using the absorption technique described above. FIG. 3 shows a plot of the NF*($a_1\Delta$) intensity vs. the partial pressure of HN₃ added to the system. In these experiments, CO₂ was added to the flow in order to insure that HF overtone emission near 874 nm was not included in the measured intensity. Measurements were made for CO₂ partial pressures of 240 and 420 mtorr. The results show that in the regime where the amount of HN₃ added (and hence the HF⁺ partial pressure) is low, the NF*($a^1\Delta$) intensity has the expected linear dependence on HN₃. In FIG. 3, NF*($a^1\Delta$) emission intensities for these two CO₂ pressures were normalized to one another in this linear region. For higher HN₃ pressures the data fall off from linearity, presumably due to pumping of the NF*($a^1\Delta$) to the NF*($b^1\Sigma^+$) state by HF⁺. This hypothesis is supported by the variation with CO₂ pressure; for the larger CO₂ concentration (hence lesser NF⁺), the linear region extends to greater HN₃ pressures.

EXAMPLE III

Figure 4:
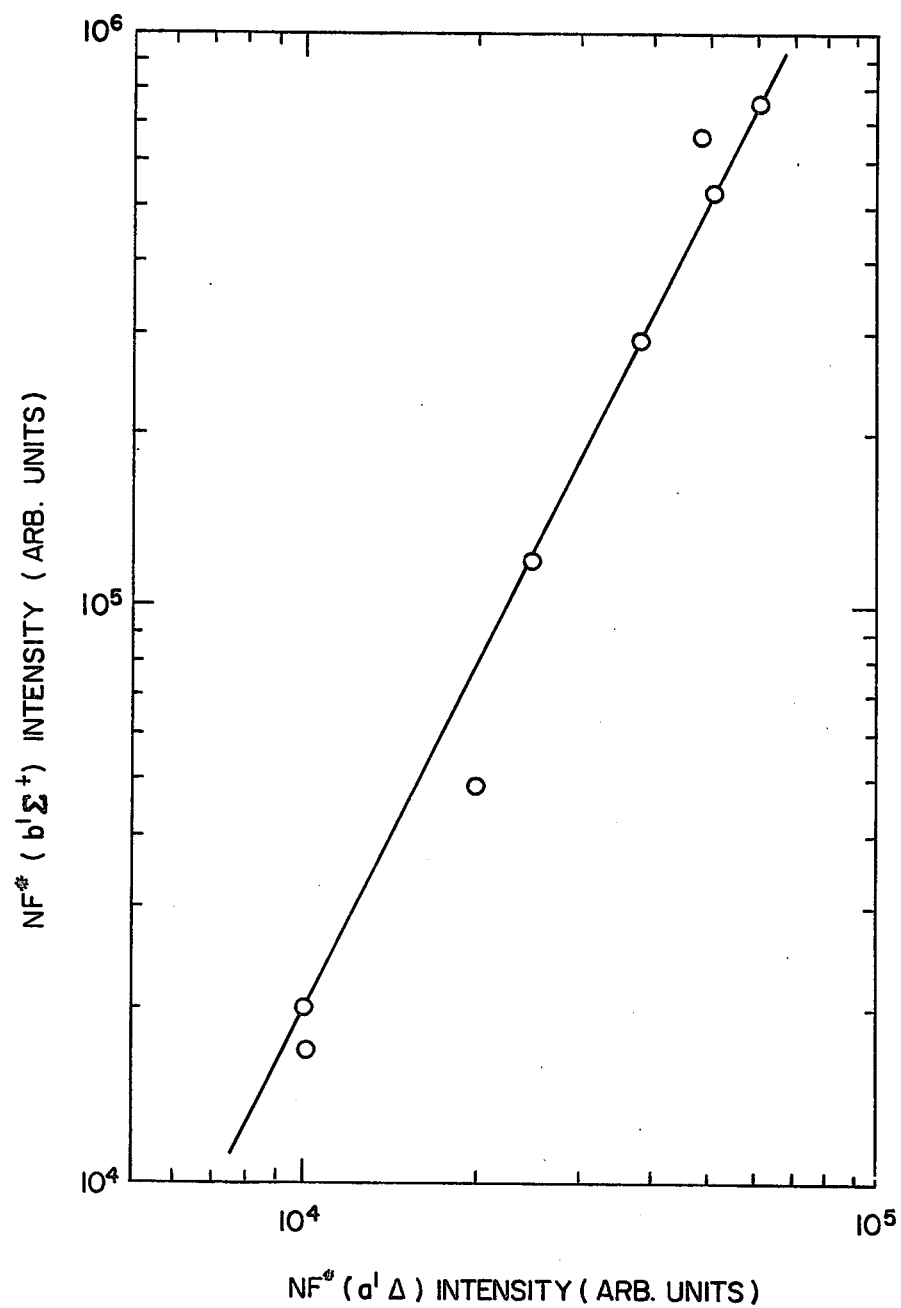
FIG. 4 is a log-log plot of NF*($b^1\Sigma+$) intensity vs. NF*($a^1\Delta$) intensity.

Experiments were run to obtain the NF* ($b^1\Sigma^+$) intensity vs. the NF*($a^1\Delta$) intensity as shown in FIG. 4.

No $CO_2$ was used in these experiments, and hence the results show some interference from $HF^\dagger$ for the highest $HN_3$ pressures used. The data shown in FIG. 4 have been corrected for this effect by substraction of the HF contribution. FIG. 4 clearly shows the quadratic relationship between the concentrations of $NF^*(b^1\Sigma+)$ and $NF^*(a^1\Delta)$ in agreement with reactions (1), (2), and (3) mentioned in Example I. Experiments at lower $HN_3$ pressures (too lowed to be accurately measured) showed that this relationship holds over more than five orders of magnitude in the $NF^*(b^1\Sigma+)$ concentration. There is no evidence for the direct production of $NF^*(b^1\Sigma+)$ by reaction (2).

EXAMPLE IV

Figure 5:
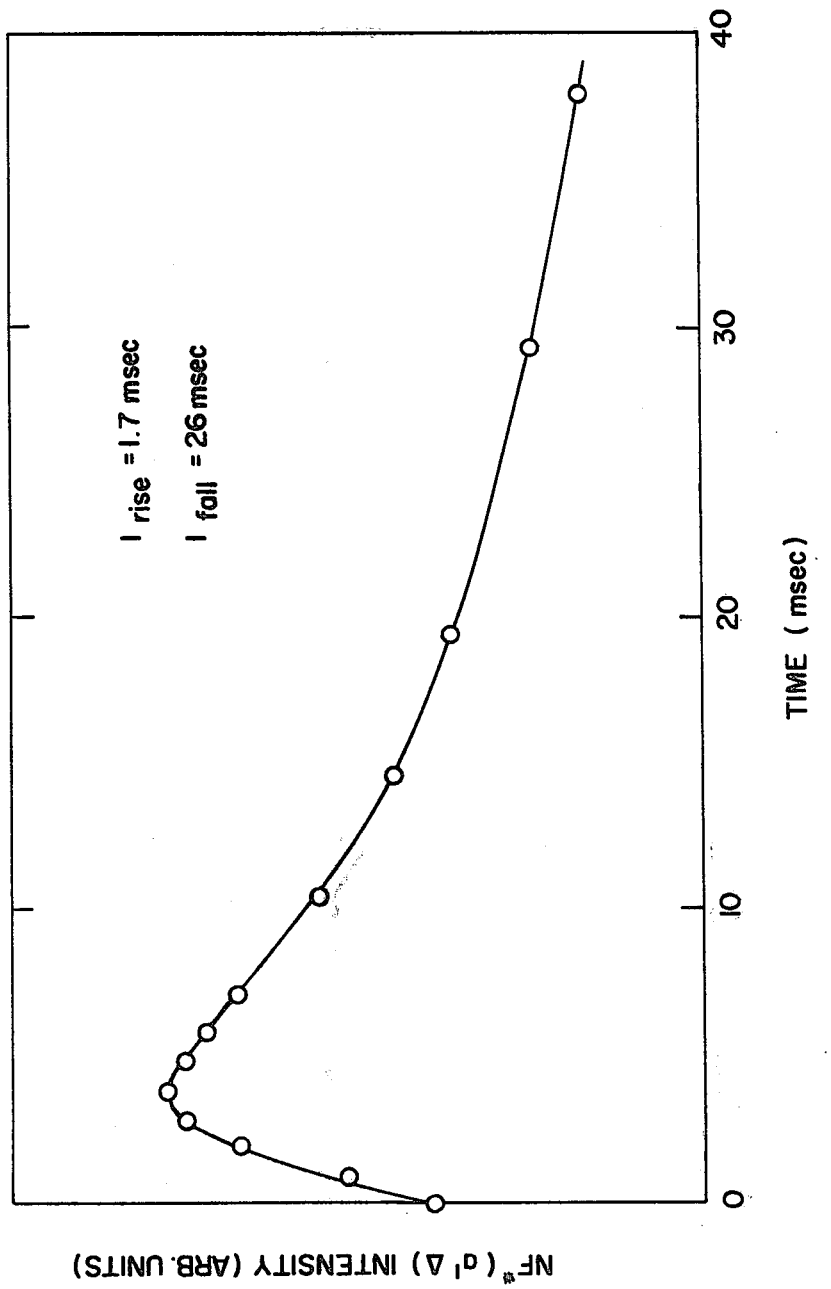
FIG. 5 is a plot of the time profile of NF*($a^1\Delta$) emission for 14 mtorr of F atoms and less than 1 mtorr of $HN_3$.

Experiments were run to determine the risetime of the $NF^*(a^1\Delta)$ emission to estimate the rate constant of reaction (1). Such an approach is valid only in the limit where the rate of reaction (1) is much greater than that of reaction (2), such that $N_3$ radicals are created instantaneously relative to the risetime of the $NF^*(a^1\Delta)$ emission. Under these conditions, $K_2 = (\tau\text{rise} [F])^{-1}$, where $[F] >> [HN_3]$. FIG. 5 shows a plot of the time profile of the $NF^*(a^1\Delta)$ emission for 14 mtorr of F atoms and <1 mtorr of $HN_3$. For these data, $CO_2$ was added to the system to quench $HF^\dagger$ and $NF^*(b^1\Sigma+)$. In addition, a 5 mm slit was placed over the observation window to give a time resolution of approximately 0.4 msec. Experiments were also performed for higher and lower fluorine atom concentrations. In each case, the concentration of F atoms was determined by titration with $Cl_2$ as discussed above. Variation of the fluorine atom concentration had little or no effect on the decay of the $NF^*(a^1\Delta)$ emission but affected only the risetime and peak intensity. Hence, the rise of the $NF^*(a^1\Delta)$ emission corresponds to the formation rate. Analysis of the data shown in FIG. 5 yields a risetime of 1.7 msec, which in turn gives a value for the rate constant $K_2 \sim 10^{12}$ cm$^3$ mole$^{-1}$ sec$^{-1}$. If reaction (1) has a rate constant on the order of $10^{13}$ cm$^3$ mole$^{-1}$ sec$^{-1}$ (similar to that of other F+RH reactions), the assumption concerning separability of the two rates would be reasonably valid. Hence, the value of $k_2$ appears to be accurate to within at least an order of magnitude.

Numerous variations and modifications may be made without departing from the present invention. For example, other methods of generating $HN_3$ and other sources of azide radicals can be utilized. Accordingly, it should be clearly understood that the form of the present invention described above and shown in the accompanying drawings is illustrative only and is not intended to limit the scope of the present invention.

What is claimed is:

1. A method of producing a mixture of gases containing electronically excited nitrogen fluoride, comprising the steps of:
   providing fluorine atoms;
   providing azide radicals;
   mixing said fluorine atoms with said azide radicals; whereby electronically excited nitrogen fluoride is formed by a reaction between said fluorine atoms and said azide radicals.

2. The method as claimed in claim 1, wherein said step of providing azide radicals comprises providing hydrogen azide.

3. A method of generating a mixture of gases containing $NF^*(a^1\Delta)$, comprising:
   providing a reaction vessel;
   introducing atomic F into said reaction vessel; and
   introducing $HN_3$ into said reaction vessel so that $NF^*(a^1\Delta)$ is forned by the reaction:
   $2F + HN_3 \rightarrow NF^*(a^1\Delta) + N_2 + HF^\dagger$ $(v \leq 5)$.

4. A method of generating a mixture of gases containing electronically excited NF, comprising:
   providing fluorine atoms;
   providing $HN_3$; and
   mixing said fluorine atoms with said $HN_3$, whereby electronically excited NF is formed by a reaction between said fluorine atoms and said NF.

5. A method of generating a mixture of gases containing electronically excited nitrogen fluoride, comprising the steps of:
   providing atomic F;
   providing $HN_3$; and
   mixing said atomic F with said $HN_3$, so that $NF^*(a^1\Delta)$ and $NF^*(b^1\Sigma+)$ are formed by the following reactions:

$F + HN_3 \rightarrow HF^\dagger$ $(v \leq 5) + N_3$, $F + N_3 \rightarrow NF^*(a^1\Delta) + N_2$, and
   $NF^*(a^1\Delta) + HF^\dagger$ $(v \leq 5) \rightarrow NF^*(b^1\Sigma+) + HF$
   $(v-2)$.

* * * * *